United States Patent
Zhang

(10) Patent No.: US 10,754,633 B2
(45) Date of Patent: Aug. 25, 2020

(54) APPLICATION INSTALLATION PACKAGE GENERATION METHOD AND APPARATUS, AND STORAGE MEDIUM

(71) Applicant: Tencent Technology (Shenzhen) Company Limited, Shenzhen (CN)

(72) Inventor: Qingji Zhang, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

(21) Appl. No.: 16/205,772

(22) Filed: Nov. 30, 2018

(65) Prior Publication Data

US 2019/0095185 A1  Mar. 28, 2019

Related U.S. Application Data

(63) Continuation-in-part of application No. PCT/CN2017/094018, filed on Jul. 24, 2017.

(30) Foreign Application Priority Data

Aug. 22, 2016 (CN) .......................... 2016 1 0702357

(51) Int. Cl.
   *G06F 8/61* (2018.01)
   *H04L 29/08* (2006.01)

(52) U.S. Cl.
   CPC ................ *G06F 8/61* (2013.01); *H04L 67/02* (2013.01); *H04L 67/34* (2013.01)

(58) Field of Classification Search
   CPC ............ H04L 67/02; H04L 67/34; G06F 8/61
   See application file for complete search history.

(56) References Cited

U.S. PATENT DOCUMENTS

| 6,560,618 B1 * | 5/2003 | Ims ........................ G06F 9/445 |
| 9,448,776 B1 * | 9/2016 | Sankaran .............. G06F 16/972 |

(Continued)

FOREIGN PATENT DOCUMENTS

| CN | 104714788 A | 6/2015 |
| CN | 105204823 A | 12/2015 |
| CN | 105278971 A | 1/2016 |

OTHER PUBLICATIONS

Tencent Technology, ISRWO, PCT/CN2017/094018, Oct. 25, 2017, 6 pgs.

(Continued)

*Primary Examiner* — Wei Y Zhen
*Assistant Examiner* — Amir Soltanzadeh
(74) *Attorney, Agent, or Firm* — Morgan, Lewis & Bockius LLP

(57) ABSTRACT

The various embodiments described herein include methods, systems, and devices for generating an application installation package. In one aspect, a computing system receives an application generation request sent by a terminal. The request carries a web page address and application attribute information of a to-be-generated application. In accordance with the request, the computing system obtains a corresponding first application template, updates the first application template according to the web page address and the application attribute information to obtain a second application template. Next, the computing system generates an installation package of an application corresponding to the web page address and in accordance with to the second application template, and returns the generated installation package to the terminal.

14 Claims, 6 Drawing Sheets

(56) References Cited

U.S. PATENT DOCUMENTS

2009/0043798 A1\* 2/2009 Tan ............................ G06F 8/61
2018/0107468 A1\* 4/2018 Huang ...................... G06F 8/61

OTHER PUBLICATIONS

Tencent Technology, IPRP, PCT/CN2017/094018, Feb. 26, 2019, 5 pgs.

\* cited by examiner

APPLICATION INSTALLATION PACKAGE GENERATION METHOD AND APPARATUS, AND STORAGE MEDIUM

CROSS REFERENCE TO RELATED APPLICATION

This application is a continuation-in-part of PCT/CN2017/094018, entitled "METHOD AND DEVICE FOR GENERATING APPLICATION INSTALLATION PACKAGE, AND STORAGE MEDIUM" filed on Jul. 24, 2017, which claims priority to Chinese Patent Application No. 201610702357.3, filed with the State Intellectual Property Office of the People's Republic of China on Aug. 22, 2016, and entitled "APPLICATION INSTALLATION PACKAGE GENERATION METHOD AND APPARATUS" all of which are incorporated herein by reference in their entirety.

FIELD OF THE TECHNOLOGY

This application relates to the field of communications technologies, and specifically, to an application installation package generation method and apparatus, and a non-transitory computer readable storage medium.

BACKGROUND OF THE DISCLOSURE

With the development of operating systems and application technologies of terminals, application developers provide diversified applications (App) of the terminals, to satisfy various requirements of users.

SUMMARY

Embodiments of this application provide an application installation package generation method and apparatus, so that generation efficiency of an installation package of a web page application can be improved.

In accordance with some embodiments, an application installation package generation method performed by a computing system having one or more processors and memory storing a plurality of programs to be performed by the one or more processors comprises: receiving an application generation request sent by a terminal, the application generation request carrying a web page address and application attribute information of a to-be-generated application; obtaining a corresponding first application template according to the application generation request; updating the first application template according to the web page address and the application attribute information, to obtain a second application template; generating, according to the second application template, an installation package of an application corresponding to the web page address; and returning the generated installation package to the terminal.

In accordance with some embodiments, an apparatus includes one or more processors and memory storing one or more programs (or one or more modules) to be executed by the one or more processors, the one or more modules including instructions for performing any of the methods described herein.

In accordance with some embodiments, a non-transitory computer readable storage medium stores one or more programs. The one or more programs, which when executed by an apparatus, cause the apparatus to perform any of the operations described herein.

BRIEF DESCRIPTION OF THE DRAWINGS

To describe the technical solutions of the embodiments of this application more clearly, the following briefly describes the accompanying drawings required for describing the embodiments. Apparently, the accompanying drawings in the following description show only some embodiments of this application, and a person of ordinary skill in the art may still derive other drawings from these accompanying drawings without creative efforts.

DESCRIPTION OF EMBODIMENTS

The following clearly and completely describes the technical solutions in the various embodiments of this disclosure with reference to the accompanying drawings. Apparently, the described embodiments are some embodiments of this application rather than all of the embodiments. All other embodiments obtained by a person skilled in the art based on the embodiments of this application without creative efforts shall fall within the protection scope of this application.

Embodiments of this application provide an application installation package generation method and apparatus. Detailed descriptions are provided below separately.

Some of the embodiments in the present disclosure are described from a perspective of an application installation package generation apparatus. The application installation package generation apparatus may be specifically integrated into devices such as a server.

An application installation package generation method is provided, including: receiving an application generation request sent by a terminal (e.g., a client device), the application generation request carrying a web page address and application attribute information; obtaining a corresponding application template (which may be referred to as a first application template) according to the application generation request; updating the first application template according to the web page address and the application attribute information, to obtain an updated application template (which may be referred to as a second application template); and generating, according to the updated application template, an installation package of an application corresponding to the web page address.

Figure 1A:
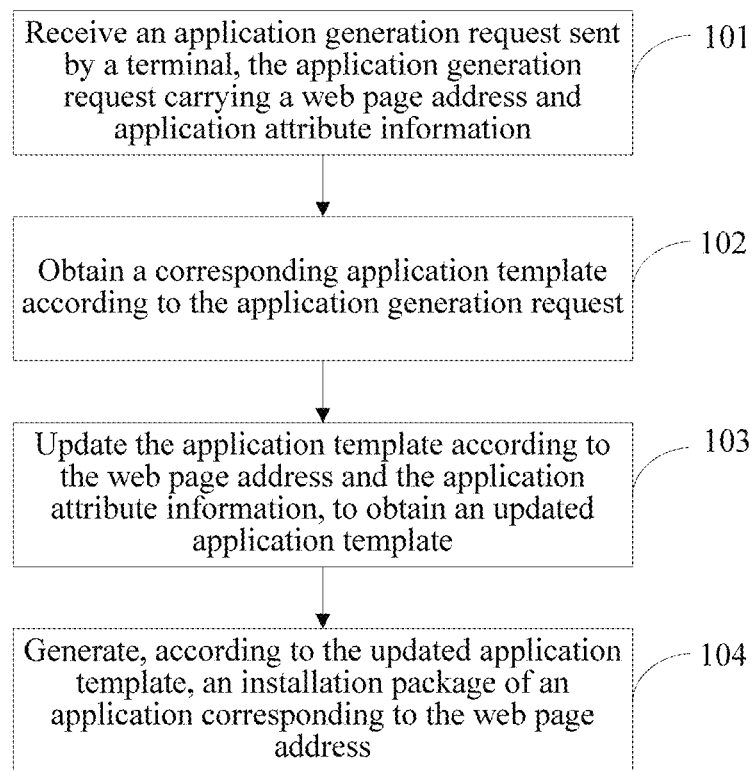
FIG. 1a is a flowchart of an application installation package generation method according to an embodiment of this application.

As shown in FIG. 1a, a specific procedure of an application installation package generation method may be as follows:

101. Receive an application generation request sent by a terminal, the application generation request carrying a web page address and application attribute information.

It can be understood that, the web address is a web page address of a to-be-generated application, and the application attribute information is application attribute information of the to-be-generated application.

For example, the application generation request sent by the terminal may be received by using a network.

The web page address may be a uniform resource locator (URL) or the like. The application attribute information may include at least one type of information of application name information, application icon information, package name information of an application installation package, application description information, and the like.

102. Obtain a corresponding application template according to the application generation request.

The application template may be a preset application template, that is, a prestored application template. In this case, a corresponding application template may be obtained from a storage unit (e.g., a storage unit of the server) according to the application generation request.

To distinguish the corresponding application template obtained in 102 from an updated application template, the corresponding application template obtained in 102 may be referred to as a first application template.

To diversify applications and improve user experience, this embodiment further provides various first application templates for selection by a user of the terminal, that is, the step of "obtaining a corresponding application template according to the application generation request" may include:

obtaining a plurality of application templates according to the application generation request; and selecting an application template required by a to-be-generated application from the plurality of application templates, that is, a first application template.

For example, a plurality of application templates is abstracted from the storage unit when an application generation request is received, and then, an application template required by a to-be-generated application is selected from the plurality of application templates according to template selection information carried in the application generation request. As another example, when application attribute information includes an application name, an application template required by a to-be-generated application may be selected from a plurality of application templates based on the application name.

In this embodiment, the application template is used to indicate a style of the to-be-generated application, and may indicate, for example, attribution information of the to-be-generated application, an associated web page address, and an architecture of the to-be-generated application. That is, the application template may include an associated sample web page address of the to-be-generated application, corresponding sample application attribute information of the to-be-generated application, corresponding application architecture information of the to-be-generated application, and the like.

The associated sample web page address of the to-be-generated application is a web page address of obtaining web page content by the to-be-generated application, and may be, for example, a news web page address or a video web page address. During actual application, the sample web page address may be an empty web page address, to save resources. A format of the web page content may include Hypertext Markup Language (HTML), HTML4, HTML5, Cascading Style Sheets (CSS), JavaScript, jQuery, java, another web page language format, or the like.

For distinction, the sample web page address included in the first application template is referred to as a first sample web page address, and the sample application attribute information included in the first application template is referred to as first sample application attribute information.

103. Update the application template according to the web page address and the application attribute information, to obtain an updated application template. In some embodiments, the updated application template is referred to as a second application template. That is, a first application template is updated according to a web page address and application attribute information of a to-be-generated application, to obtain a second application template.

Specifically, the sample web page address in the application template may be updated according to the web page address, and the sample application attribute information is updated according to the application attribute information. In some embodiments, the user also inputs one or more user preferences as part of the update process. Examples of user preferences include, and are not limited to: time zone, language, web page refresh interval, background preferences, font size etc. To be distinguished from the first sample address, a sample web page address in the second application template may be referred to as a second sample web page address, and sample application attribute information in the second application template is referred to as second sample application attribute information, that is, the step of "updating the application template according to the web page address and the attribute information, to obtain an updated application template" may include:

updating the sample web page address according to the web page address, to obtain an updated sample web page address, that is, updating the first sample web page address according to the web page address of the to-be-generated application, to obtain a second sample web page address;

updating the sample application attribute information according to the application attribute information, to obtain updated sample application attribute information, that is, updating the first sample application attribute information according to the application attribute information of the to-be-generated application, to obtain second sample application attribute information; and determining an updated application template according to the updated sample web page address and the updated sample application attribute information, that is, determining the second application template according to the second sample web page address and the second sample application attribute information.

It can be understood that, the second sample web page address is actually the web page address carried in the application generation request, and the second sample application attribute information is actually the application attribute information carried in the application generation request.

Specifically, the sample web page address (that is, the first sample web page address) is replaced with the web page address carried in the request, and the sample application attribute information (that is, the first sample application attribute information) is replaced with the attribute information carried in the request. For example, a sample application name is replaced with a name carried in the request, and sample icon information is replaced with icon information carried in the request.

In this embodiment, after the web page address is updated, an updated application template may be re-determined based on an updated sample web page address and updated sample application attribute information. Specifically, the application template further includes application architecture information of the to-be-generated application, and the updated application template may be determined according to the application architecture information, the updated sample web page address, and the updated sample application attribute information, that is, the second application template is determined according to the application architecture information, the second sample web page address, and the second sample application attribute information.

In some embodiments, to reduce the size of an installation package of an application, and facilitate downloading and widespread use of the application, the architecture of the to-be-generated application in this embodiment may be a layered architecture (e.g., a three-layer architecture). In this instance, the three-layer architecture may include an interaction interface layer, a function logical layer, and an application bottom layer. The interaction interface layer is used for implementing an interaction interface required by the to-be-generated application, and the interaction interface layer may include application page information (for example, webview rendering page information), toolbar information, option information, menu information, and the like. With the layered architecture, the key functions are separated into different logical locations, where they can be executed, managed, and changed with relative independence.

The function logical layer is used for providing functions required by the to-be-generated application, and the function logical layer may include various function modules of the to-be-generated application. For example, the function logical layer may include function modules such as push (push), counting, settings, upgrade, downloading, sharing, and beacon.

The application bottom layer is used for implementing a communication function, a data storage function, or the like of the to-be-generated application. The application bottom layer may include a database module, a communication module (such as a web protocol module and a WUP protocol module), a toolbar, a configuration module, a browser kernel calling module, or the like. To improve page rendering performance and speed of opening an application, the browser kernel calling module may select and use a software development kit (SDK) of a TBS browsing service kernel, and the like.

Therefore, in this embodiment, the application architecture information may include: function logical layer information, interaction interface layer information, and application bottom layer information. The function logical layer information includes various function modules. To satisfy individual demands of users and improve user experience, in this embodiment, the function modules of the function logical layer may further be selected based on user function selection, that is, the functions required by the to-be-generated application, that is, the application generation request may further carry function selection information.

In this case, the step of "determining the updated application template according to the application architecture information, the updated sample web page address, and the updated sample application attribute information" may include:

selecting a corresponding target function module from the various function modules according to the function selection information; and determining the updated application template according to the target function module, the interaction interface layer information, the application bottom layer information, the updated sample web page address, and the updated sample application attribute information, that is, determining the second application template according to the target function module, the interaction interface layer information, the application bottom layer information, the second sample web page address, and the second sample application attribute information.

Figure 1B:
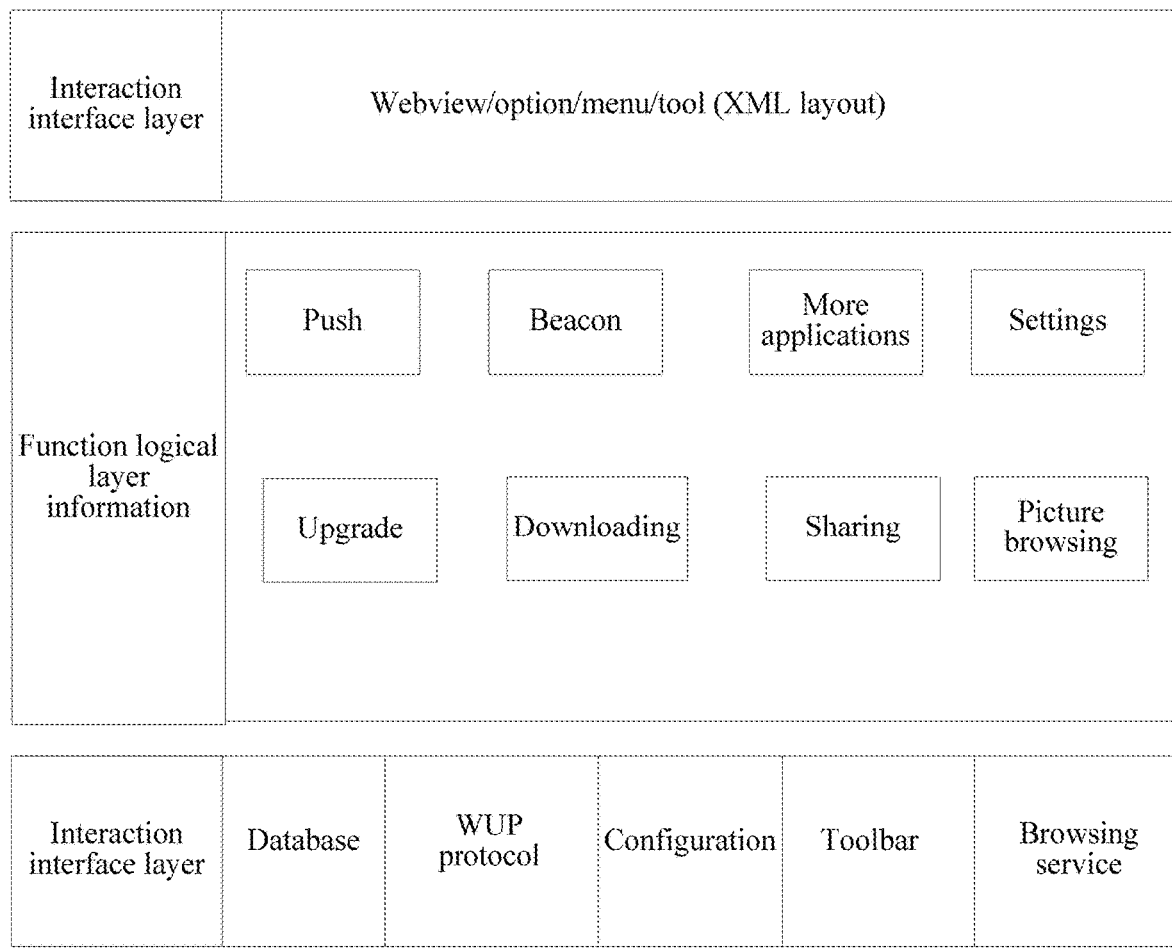
FIG. 1b is a schematic architectural diagram of an application according to an embodiment of this application.

Referring to FIG. 1b, in some embodiments, the application architecture of the to-be-generated application in this embodiment may include an interaction interface layer (that is, a UI layer), a function logical layer, and an application bottom layer.

The interaction interface layer may include interface layout files such as a webview (webview) rendering page, a toolbar, options, and menus. A format of the interface layout file may be Extensible Markup Language (XML) and the like. In this case, the interaction interface layer may include layout files that are of an (XML) format such as webview and a toolbar and that are represented as (XML) Layout.

The function logical layer may include function modules such as push (push), counting, settings, upgrade, downloading, sharing, picture viewing, more applications, and beacon.

The bottom layer may include basic modules such as a database module (configured to create a database of the to-be-generated application), a WUP protocol module (configured to perform data communication with the background by using a WUP protocol), a configuration module (configured to configure the to-be-generated application), a toolbar module (configured to generate a toolbar), and an SDK of a TBS kernel (configured to call a TBS browsing service kernel). The TBS is Tencent Browsing Service.

104. Generate, according to the updated application template, an installation package of an application corresponding to the web page address.

In some embodiments, after the generation step 104, the server computing system returns the generated installation package to the terminal, to be downloaded on the terminal. In some embodiments, the server sends a downloading address of the installation package of the application corresponding to the web page address to the terminal. In some embodiments, responsive to selection of the downloading address by the terminal, the server causes downloading of the installation package on the terminal.

In some embodiments, after the download step is performed, the second application template appears as a user-selectable affordance (e.g., as a user activatable icon or thumbnail) on the terminal. In some embodiments, the terminal is a mobile device or a tablet with a touch-sensitive display, and the generated installation package is displayed as a user-selectable affordance along with the other apps on the mobile device or tablet. When the user selects the affordance, the user is directed immediately to the web page. Thus, the user does not have to open a web browser on the terminal to access the web page. Accordingly, the disclosed application installation package generation methods and systems provide ease of access and convenience to the user by eliminating the step of having to open a web browser to access the web pages. The second application template can be analogized to a personalized, one-click bookmark that can be launched directly from the display of the terminal.

Specifically, a packaging process may be called by using a script, and then the updated application template may be packaged according to the packaging process, to obtain the installation package of the application corresponding to the web page address, that is, the second application template is packaged by using the packaging process, to obtain an installation package of an application corresponding to the web page address of the to-be-generated application.

For example, after it is determined that the application template is updated, the updated application template may be compiled, then the compiled application template is packaged by calling a corresponding packaging process by using the script, and finally the installation package of the application corresponding to the web page address is obtained.

It can be understood that, the web page address in the second application template is the web page address of the to-be-generated application, the attribute information in the second application template is the attribute information of the to-be-generated application, and a process of packaging the second application template is actually a process of packaging the web page address and the attribute information in the second application template.

In some embodiments, in the method of this embodiment, the downloading address of the installation package may further be sent to the terminal, so that the terminal may download the installation package according to the downloading address, for example, a two-dimensional barcode carrying the downloading address may be delivered to the terminal, so that the terminal identifies the downloading address from the two-dimensional barcode, and downloads the installation package according to the downloading address.

For example, when a user downloads and installs the foregoing installation package on the terminal by scanning the two-dimensional barcode, a shortcut is set on a desktop of the terminal, a name and an icon of the shortcut are respectively consistent with the application name information and the application icon information of the attribute information in step 101. In some embodiments, the terminal is a client device (e.g., a mobile phone with a touch-sensitive display) and the installation package is displayed as a user-selectable affordance on the mobile phone. When the user clicks the shortcut, a page corresponding to a corresponding web page address is jumped to, the page displays various functions of the application, and the user can perform operations on the page according to requirements. That is, the installation package is generated on a premise that a corresponding page (for example, an HTML5 page) already exists. When the user uses the application, operations are actually performed on the page.

It can be learned from the above that, in this embodiment, when the application generation request sent by the terminal is received, the corresponding application template may be obtained according to the application generation request, then the application template is updated according to the web page address and the application attribute information carried in the application generation request, to obtain an updated application template, and the installation package of the application corresponding to the web page address is generated according to the updated application template. In this solution, an installation package of a web page application may be automatically generated by using the application template, and code does not need to be manually written based on a Native App technology (Native app refers to applications that are installed through an application store, such as Google Play™ or Apple's App Store™. Native apps are developed specifically for one platform). Therefore, compared with the prior art, the generation efficiency of the installation package of the web page application may be improved.

In addition, in this embodiment, an installation package of a three-layer architecture application may be generated, so that the size of the installation package may be reduced, system resources of the terminal may be saved, and therefore the installation package of an application can be quickly downloaded and it is convenient to spread the installation package.

Some embodiments of this disclosure are described from a perspective of another application installation package generation apparatus. The application installation package generation apparatus may be specifically integrated into devices such as a terminal, and the terminal may be devices such as a mobile phone, a personal computer (PC), or a tablet computer.

An application installation package generation method includes: obtaining a web page address and application attribute information, then generating an application generation request according to the web page address and the application attribute information, the application generation request carrying the web page address and the application attribute information, and sending the application generation request to a server, so that the server generates, according to the application generation request, an installation package of an application corresponding to the web page address.

Figure 2:
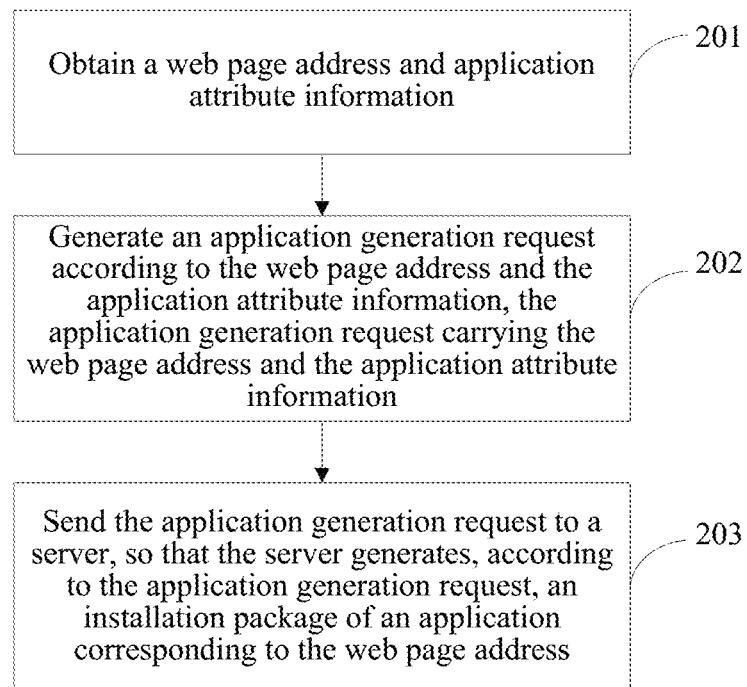
FIG. 2 is another flowchart of an application installation package generation method according to an embodiment of this application.

As shown in FIG. 2, a specific procedure of an application installation package generation method may be as follows:

201. Obtain a web page address and application attribute information.

The web page address may be a URL and the like. The application attribute information may include at least one type of information of application name information, application icon information, package name information of an application installation package, application description information, and the like.

In this embodiment, the web page address and the application attribute information may be obtained in various manners. For example, a page may be generated, and an information obtaining interface may be set on the page. In this embodiment, the generation apparatus may obtain the web page address and the application attribute information by using the information obtaining interface, that is, the step of "obtaining a web page address and application attribute information" may include:

displaying an application generation page, the application generation page including an address obtaining interface and an attribute obtaining interface;

obtaining the web page address by using the address obtaining interface; and obtaining the application attribute information by using the attribute obtaining interface.

The address obtaining interface and the attribute obtaining interface may be presented in various forms, and may be presented, for example, in a form of an input box or an icon.

For example, a page information obtaining request may be sent to a corresponding server by using a browser, page information that is returned by the server according to the page information obtaining request is received, and an application generation page is displayed according to the page information. The application generation page may include an address obtaining interface, an icon information obtaining interface, an application name information obtaining interface, an installation package name obtaining interface, and the like. A user may enter corresponding information by using a corresponding interface, and may, for example, enter a web page address by using the address obtaining interface, or enter application name information by using the application name information obtaining interface. In this case, the generation apparatus may obtain corresponding entered information such as icon information and an address.

In some embodiments, to provide diversified applications, in this embodiment, function selection information may further be obtained. The function selection information is used for indicating a function module required by the to-be-generated application, for example, indicating function modules such as sharing, downloading, and settings and required by the to-be-generated application.

202. Generate an application generation request according to the web page address and the application attribute information, the application generation request carrying the web page address and the application attribute information.

Specifically, a request generation instruction may be received, a web page address and application attribute information are called according to the request instruction, and then an application generation request is generated according to the web page address and the application attribute information.

For example, the application generation page may further include an application generation interface. In this case, the request generation instruction triggered by a user by using the application generation interface may be received.

In some embodiments, when the function selection information is obtained, the step of "generating an application generation request according to the web page address and the application attribute information" may include: generating an application generation request according to the web page address, the application attribute information and the function selection information, the application generation request further carrying the function selection information.

During actual application, other information indicating features and functions of the to-be-generated application may further be obtained, and is sent to the server by using the application generation request, so that an application required by a user is generated.

203. Send the application generation request to a server, so that the server generates, according to the application generation request, an installation package of an application corresponding to the web page address.

For example, the application generation request may be sent to the server by using a browser.

In some embodiments, in this embodiment, after the application generation request is sent to the server, an application installation package may further be downloaded from the server and is installed, that is, after step 103, the method of this embodiment may further include:

receiving a downloading address of the installation package and sent by the server;

downloading the installation package from the server according to the downloading address; and installing, according to the installation package, the application corresponding to the web page address.

For example, a two-dimensional barcode sent by the server is received, the two-dimensional barcode carrying a downloading address of the installation package. In this case, the two-dimensional barcode may be identified, to obtain the downloading address, and the installation package is downloaded from the server according to the downloading address, and then the application is installed according to the installation package.

It can be learned from the above that, in this embodiment, the web page address and the application attribute information are obtained, and then, the application generation request is generated according to the web page address and the application attribute information, the application generation request carrying the web page address and the application attribute information, and the application generation request is sent to the server, so that the server generates, according to the application generation request, the installation package of the application corresponding to the web page address. In this solution, an installation package of a web page application is automatically generated by using the server, and code does not need to be manually written based on a Native App technology. Therefore, compared with the prior art, the generation efficiency of the installation package of the web page application may be improved.

According to the method described in FIG. 1a, the following further provides detailed descriptions by using an example.

In this embodiment, that the generation apparatus described in FIG. 1b is integrated into a server, and the generation apparatus described with respect to FIG. 2 is integrated into a terminal is used as an example for description.

Figure 3A:
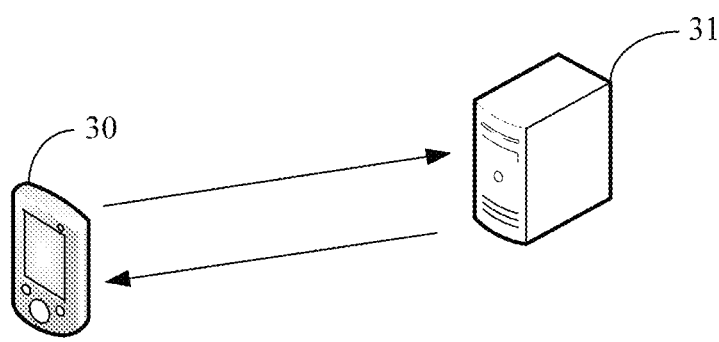
FIG. 3a is a schematic structural diagram of an application generation system according to an embodiment of this application.

As shown in FIG. 3a, this embodiment provides an application generation system. The system includes a terminal 30 and a server 31, and the terminal 30 and the server 31 are connected by using a network, for example, are connected by using a WiFi wireless network.

The following describes in detail an application installation package generation method of this application based on the application generation system.

Figure 3B:
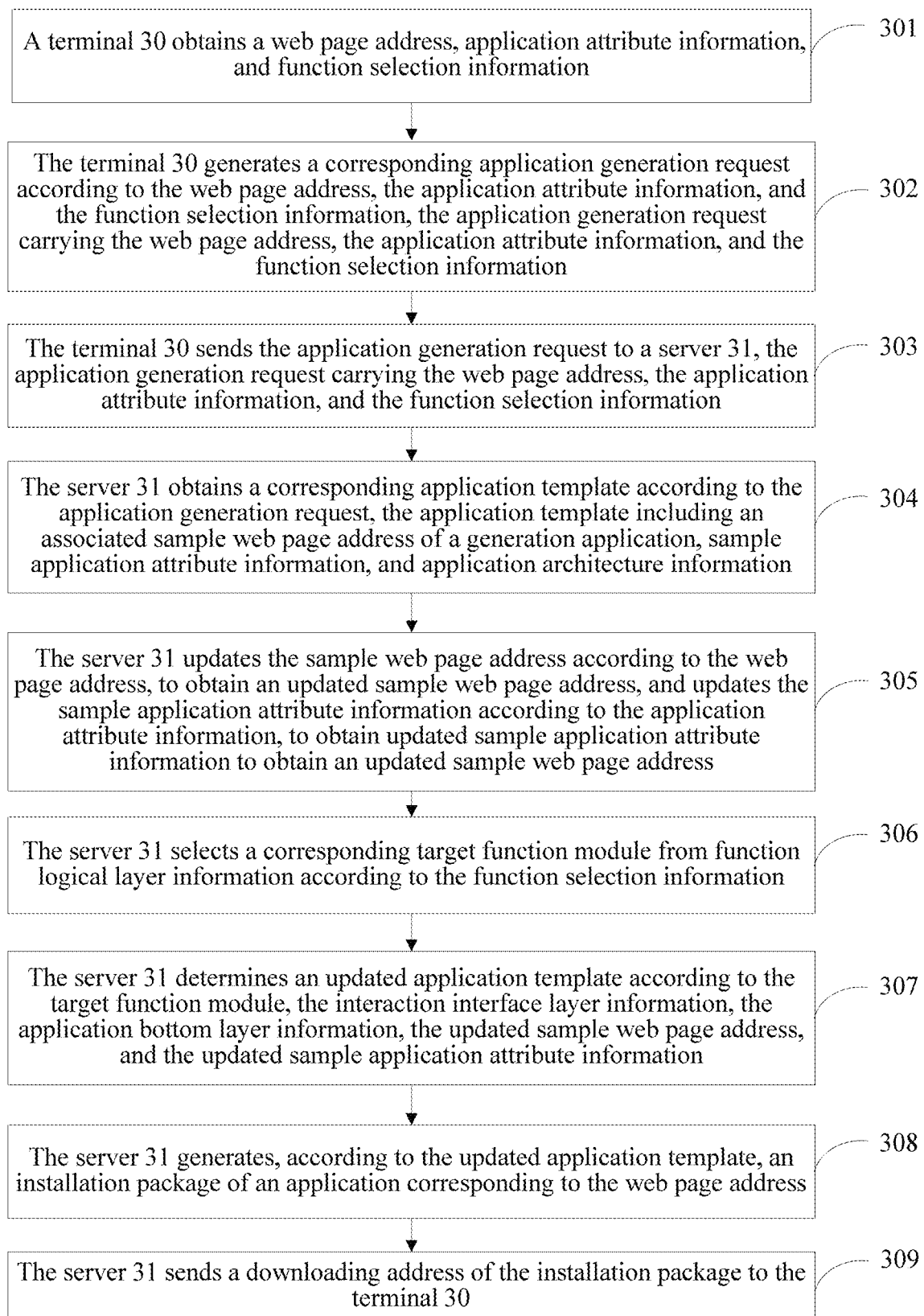
FIG. 3b is still another flowchart of an application installation package generation method according to an embodiment of this application.

As shown in FIG. 3b, a specific procedure of an application installation package generation method may be as follows:

301. A terminal 30 obtains a web page address, application attribute information, and function selection information.

The web page address may be a URL and the like. The application attribute information may include at least one type of information of application name information, application icon information, package name information of an application installation package, application description information, and the like.

The function selection information is function module selection information, and the function selection information is used for indicating a function module required by the to-be-generated application, for example, indicating function modules of uploading, downloading, settings, and the like that are required by the to-be-generated application.

Specifically, the terminal 30 displays an application generation page, the application generation page including an address obtaining interface, an attribute obtaining interface, and a function selection obtaining interface. Then, the web page address is obtained by using the address obtaining interface, the application attribute information is obtained by using the attribute obtaining interface, and the function selection information is obtained by using the function selection obtaining interface.

For example, the terminal 30 may send a page information obtaining request to the server, receive page information returned by the server according to the page information obtaining request, and display an application generation page according to the page information.

302. The terminal 30 generates a corresponding application generation request according to the web page address, the application attribute information, and the function selection information, the application generation request carrying the web page address, the application attribute information, and the function selection information.

For example, the terminal 30 may receive a request sending instruction triggered by a user by using an application generation page, then call the web page address, the application attribute information, and the function selection information according to the instruction, and next, generate a corresponding application generation request according to the web page address, the application attribute information, and the function selection information.

303. The terminal 30 sends the application generation request to a server 31, the application generation request carrying the web page address, the application attribute information, and the function selection information.

For example, the terminal 30 may send the application generation request to the server 31 by using a browser.

304. The server 31 obtains a corresponding application template according to the application generation request, the application template including an associated sample web page address of a generation application, sample application attribute information, and application architecture information.

The application template is used for indicating a style of the to-be-generated application, for example, may indicate the attribute information of the to-be-generated application, an associated web page address, an architecture of the to-be-generated application, and the like, that is, the application template may include an associated sample web page address of the to-be-generated application, sample application attribute information corresponding to the to-be-generated application, application architecture information corresponding to the to-be-generated application, or the like. The associated sample web page address of the to-be-generated application is a web page address by using which the to-be-generated application obtains web page content, and may be, for example, a picture web page address or a video web page address.

To reduce the size of an installation package of an application, and facilitate downloading and spread of the application, the architecture of the to-be-generated application in this embodiment may be a three-layer architecture. In some embodiments, the three-layer architecture may include an interaction interface layer, a function logical layer, and an application bottom layer. Specifically, refer to FIG. 1b. Therefore, the application architecture information may include function logical layer information, interaction interface layer information, and application bottom layer information. The function logical layer information includes various function modules such as function modules of sharing, settings, and push.

The application bottom layer information may include a database module, a communication module (such as a web protocol module and a WUP protocol module), a toolbar, a configuration module, a browser kernel calling module, or the like. To improve page rendering performance and speed of opening an application, the browser kernel calling module may select and use an SDK of a TBS browsing service kernel, and the like.

305. The server 31 updates the sample web page address according to the web page address, to obtain an updated sample web page address, and updates the sample application attribute information according to the application attribute information, to obtain updated sample application attribute information to obtain an updated sample web page address.

For example, the server 31 may replace the sample web page address with the web page address, replace the sample application attribute information with the application attribute information, replace an application name as a name carried in the request, replace an application icon with an icon carried in the request, and the like.

306. The server 31 selects a corresponding target function module from function logical layer information according to the function selection information.

For example, the function modules of settings, sharing, downloading, and the like may be selected from the function logical layer information according to the function selection information.

307. The server 31 determines an updated application template according to the target function module, the interaction interface layer information, the application bottom layer information, the updated sample web page address, and the updated sample application attribute information.

308. The server 31 generates, according to the updated application template, an installation package of an application corresponding to the web page address.

For example, the server 31 calls a packaging process by using a script, and packs the updated application template by using the packaging process, to obtain an installation package of an application corresponding to the web page address.

309. The server 31 sends a downloading address of the installation package to the terminal 30.

For example, the server 31 may send a two-dimensional barcode carrying the downloading address of the installation package to the terminal, so that the terminal 30 or another terminal may download the installation package. In some embodiments, the server 31 sends the downloading address of the installation package to the terminal as a user-activatable link or icon/thumbnail. In some embodiments, the server 31 sends the information of the downloading address of the installation package to the terminal via an instant messaging application installed on the terminal, or to an electronic mailbox (i.e., to an email address) associated with the user of the terminal.

It can be learned from the above that, in this embodiment, when the application generation request sent by the terminal is received, the corresponding application template may be obtained according to the application generation request, then the application template is updated according to the web page address and the application attribute information carried in the application generation request, to obtain an updated application template, and the installation package of the application corresponding to the web page address is generated according to the updated application template. In this solution, an installation package of a web page application may be automatically generated by using the application template, and code does not need to be manually written based on a Native App technology. Therefore, compared with the prior art, the generation efficiency of the installation package of the web page application may be improved, and manufacturing costs are reduced.

In addition, a web page application between a light app and a native app may be generated based on the method in this embodiment, and the app (application) is actually a real app but has a very small installation package whose size is only 1 M. Compared with a common app, this app is light and portable and it is easy to spread this app, and this app is as powerful as the common app. In addition, compared with the light app, this app has a desktop attribute. After being installed by a user, this app may occupy a desktop entrance, and unless the user uninstalls this app, there is an entrance on the desktop to be entered. Compared with a common native app, this app package is smaller in file size and it is easier to be downloaded and shared, thus system resources of a server and an installation terminal can be saved.

Figure 4:
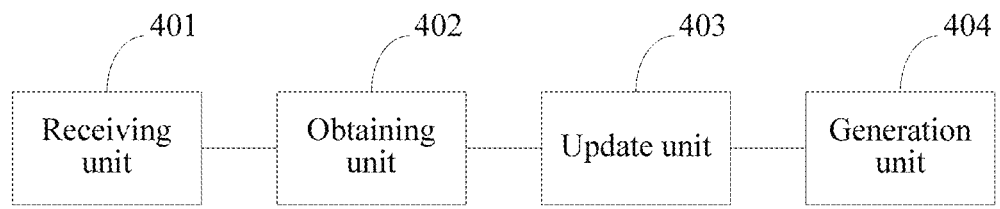
FIG. 4 is a schematic structural diagram of an application installation package generation apparatus according to an embodiment of this application.

FIG. 4 shows another embodiment of this application, and further provides an application installation package generation apparatus. As shown in FIG. 4, the application installation package generation apparatus includes:

memory; and one or more processors.

The memory stores one or more instruction units (program modules), configured to be executed by the one or more processors.

The one or more instruction units include: a receiving unit 401, an obtaining unit 402, an update unit 403, and a generation unit 404 that are as follows:

(1) The receiving unit 401.

The receiving unit 401 is configured to receive an application generation request sent by a terminal, the application generation request carrying a web page address and application attribute information.

(2) The obtaining unit 402.

The obtaining unit 402 is configured to obtain a corresponding application template according to the application generation request.

For example, the obtaining unit 402 may be further configured to obtain, according to the application generation, an application template pre-stored in a storage unit.

(3) The update unit 403.

The update unit 403 is configured to update the application template according to the web page address and the application attribute information, to obtain an updated application template.

The application template information includes an associated sample web page address of the to-be-generated application and sample application attribute information corresponding to the to-be-generated application.

In this case, the update unit 403 may include an address update subunit, an attribute update subunit, and a determining subunit. In other embodiments, the update unit 403 performs the functions of the address update subunit, the attribute update subunit, and the determining subunit.

The address update subunit is configured to update the sample web page address according to the web page address, to obtain an updated sample web page address.

The attribute update subunit is configured to update the sample application attribute information according to the application attribute information, to obtain updated sample application attribute information.

The determining subunit is configured to determine the updated application template according to the updated sample web page address and the updated sample application attribute information.

The application template further includes application architecture information of the to-be-generated application.

In this case, the determining subunit is further configured to determine the updated application template according to the application architecture information, the updated sample web page address, and the updated sample application attribute information.

For example, the application generation request further carries function selection information, the application architecture information includes function logical layer information, interaction interface layer information, and application bottom layer information, the function logical layer information includes various function modules, and the determining subunit may be further configured to:

select a corresponding target function module from the various function modules according to the function selection information; and determine the updated application template according to the target function module, the interaction interface layer information, the application bottom layer information, the updated sample web page address, and the updated sample application attribute information.

(4) The generation unit 404.

The generation unit 404 is configured to generate, according to the updated application template, an installation package of an application corresponding to the web page address. The generation unit 404 is further configured to return the generated installation package to the terminal. This may be, for example, as follows:

The generation unit 404 may be further configured to: call a packaging process by using a script, and pack the updated application template according to the packaging process, to obtain the installation package of the application corresponding to the web page address.

During specific implementation, the foregoing units may be implemented as independent entities, or may be combined arbitrarily, or may be implemented as a same entity or several entities. For specific implementation of the foregoing units, refer to the foregoing method embodiments. Details are not described herein again.

The application installation package generation apparatus may be further integrated into devices such as a server, as can be learned from the above.

In this embodiment of this application, when the application generation request sent by the terminal is received, the obtaining unit 402 may obtain the corresponding application template according to the application generation request, then the update unit 403 updates the application template according to the web page address and the application attribute information carried in the application generation request, to obtain the updated application template, and the generation unit 404 generates, according to the updated application template, the installation package of the application corresponding to the web page address. In this solution, an installation package of a web page application may be automatically generated by using the application template, and code does not need to be manually written based on a Native App technology. Therefore, compared with the prior art, the generation efficiency of the installation package of the web page application may be improved.

Figure 5A:
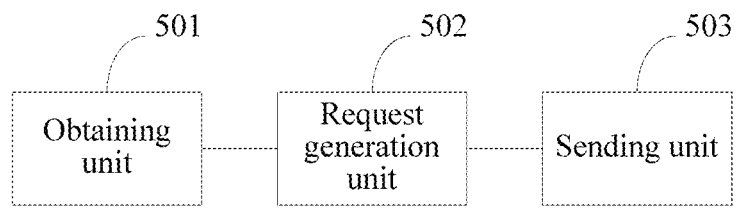
FIG. 5a is another schematic structural diagram of an application installation package generation apparatus according to an embodiment of this application.

To better implement the foregoing method, correspondingly, this embodiment of this application further provides another application installation package generation apparatus. As shown in FIG. 5a, the graphical interface processing apparatus includes:

memory; and one or more processors.

the memory stores one or more instruction units (program modules), configured to be executed by the one or more processors.

The one or more instruction units include an obtaining unit 501, a request generation unit 502, and a sending unit 503 that are as follows:

(1) The obtaining unit 501.

The obtaining unit 501 is configured to obtain a web page address and application attribute information.

The web page address may be a URL and the like. The application attribute information may include at least one type of information of application name information, application icon information, package name information of an application installation package, application description information, and the like.

In this embodiment, the web page address and the application attribute information may be obtained in various manners. For example, a page may be generated, and an information obtaining interface may be set on the page. In this embodiment, the generation apparatus may obtain the web page address and the application attribute information by using the information obtaining interface, that is, the obtaining unit 501 may be further configured to:

display an application generation page, the application generation page including an address obtaining interface and an attribute obtaining interface;

obtain the web page address by using the address obtaining interface; and obtain the application attribute information by using the attribute obtaining interface.

The address obtaining interface and the attribute obtaining interface may be presented in various forms, and may be presented, for example, in a form of an input box or an icon.

(2) The request generation unit 502.

The request generation unit 502 is configured to generate an application generation request according to the web page address and the application attribute information, the application generation request carrying the web page address and the application attribute information.

For example, the request generation unit 502 may be further configured to receive a request generation instruction, call the web page address and the application attribute information according to the request instruction, and then generate the application generation request according to the web page address and the application attribute information.

(3) The sending unit 503.

The sending unit 503 is configured to send the application generation request to a server, so that the server generates, according to the application generation request, an installation package of an application corresponding to the web page address.

Figure 5B:
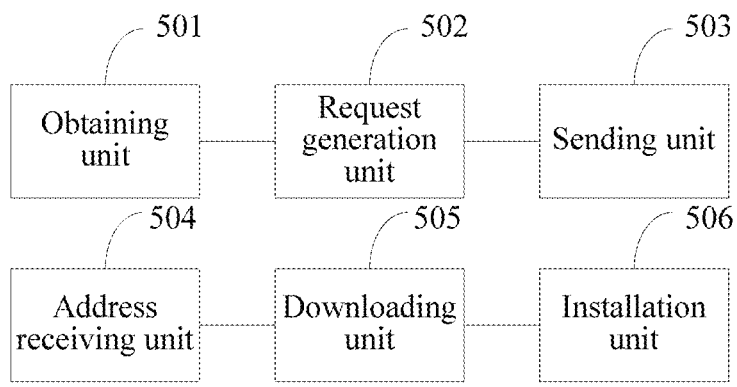
FIG. 5b is still another schematic structural diagram of an application installation package generation apparatus according to an embodiment of this application.

In some embodiments, to make the terminal install the application quickly, referring to FIG. 5b, the apparatus in this embodiment may further include:

an address receiving unit 504, configured to: after the sending unit sends the application generation request to the server, receive a downloading address of the installation package and sent by the server;

the downloading unit 505, configured to download the installation package from the server according to the downloading address; and the installation unit 506, configured to install, according to the installation package, the application corresponding to the web page address.

For example, the address receiving unit 504 may be configured to receive a two-dimensional barcode sent by the server, the two-dimensional barcode carrying the downloading address of the installation package. In this case, the downloading unit 505 may be configured to identify the two-dimensional barcode, to obtain the downloading address and download the installation package from the server according to the downloading address, and then the installation unit 506 may be configured to install the application according to installation package.

In some embodiments, it can be learned that the obtaining unit 501 may be further configured to:

display an application generation page, the application generation page including an address obtaining interface and an attribute obtaining interface;

obtain the web page address by using the address obtaining interface; and obtain the application attribute information by using the attribute obtaining interface.

During specific implementation, the foregoing units may be implemented as independent entities, or may be combined arbitrarily, or may be implemented as a same entity or several entities. For specific implementation of the foregoing units, refer to the foregoing method embodiments. Details are not described herein again.

The application installation package generation apparatus may be specifically integrated into devices such as a terminal, and the terminal may be a mobile phone, a tablet computer, or the like.

It can be learned from the above that, in this embodiment, the obtaining unit 501 is used for obtaining the web page address and the application attribute information, then the request generation unit 502 generates the application generation request according to the web page address and the application attribute information, the application generation request carrying the web page address and the application attribute information, and the sending unit 503 sends the application generation request to the server, so that the server generates, according to the application generation request, the installation package of the application corresponding to the web page address. In this solution, an installation package of a web page application is automatically generated by using the server, and code does not need to be manually written based on a Native App technology. Therefore, compared with the prior art, the generation efficiency of the installation package of the web page application may be improved.

Figure 6:
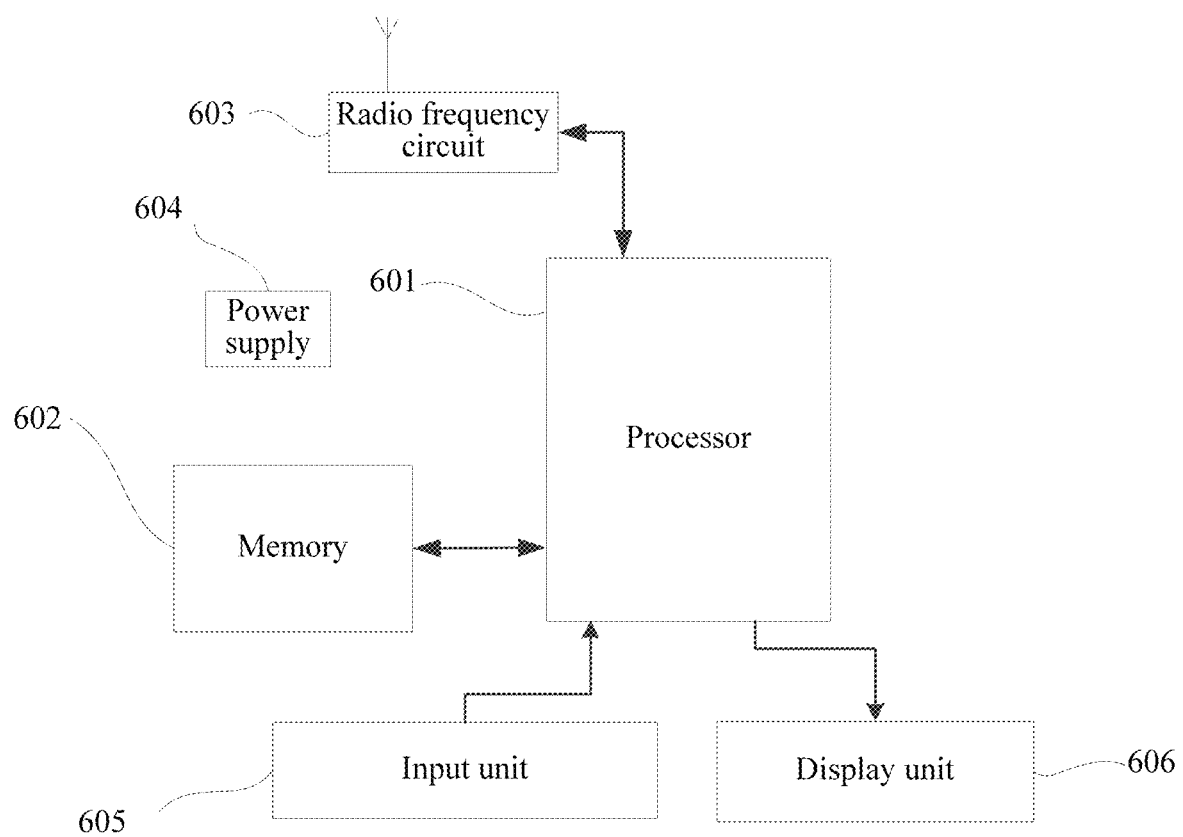
FIG. 6 is a schematic structural diagram of a server according to an embodiment of this application.

In addition, some embodiments of this application further provide a server (computing system), and an application installation package generation apparatus may be integrated into the server. FIG. 6 is a schematic structural diagram of the server according to one embodiment of this application, and specifically:

The server may include components such as a processor 601 including one or more processing cores, a memory 602 including one or more non-transitory computer-readable storage media, a radio frequency (RF) circuit 603, a power supply 604, an input unit 605, and a display unit 606. A person skilled in the art may understand that the server structure shown in FIG. 6 does not constitute a limit to the server. The server may include more or fewer parts than those shown in the figure, may combine some parts, or may have different part arrangements.

The processor 601 is a control center of the server, and is connected to various parts of the entire server by using various interfaces and lines. By running or executing a software program and/or module stored in the memory 602, and invoking data stored in the memory 602, the processor 601 executes various functions of the server and performs data processing, thereby monitoring the entire server. In some embodiments, the processor 601 may include one or more processing cores. Preferably, the processor 601 may integrate an application processor and a modem processor, where the application processor mainly processes an operating system, a user interface, and an application and the like, and the modem processor mainly processes wireless communication. It can be understood that the foregoing modem processor may alternatively not be integrated into the processor 601.

The memory 602 may be configured to store one or more software programs and modules. The processor 601 runs the software programs and modules stored in the memory 602, to implement various functional applications and data processing. The memory 602 may mainly include a program storage area and a data storage area. The program storage area may store an operating system, an application required by at least one function (such as a sound playing function and an image display function), and the like. The data storage area may store data created according to use of the server, and the like. In addition, the memory 602 may include a high speed random access memory, and may further include a non-volatile memory, such as at least one magnetic disk storage device, a flash memory, or other volatile solid-state storage devices. Correspondingly, the memory 602 may further include a memory controller, to provide access of the processor 601 to the memory 602.

The RF circuit 603 may be configured to receive and send a signal during information transmission and receiving. Especially, the RF circuit 601 sends, after receiving downlink information of a base station, the information to one or more processors 601 for processing, and sends involved uplink data to the base station. Generally, the RF circuit 603 includes but is not limited to an antenna, at least one amplifier, a tuner, one or more oscillators, a subscriber identity module (SIM) card, a transceiver, a coupler, a low noise amplifier (LNA), a duplexer, and the like. In addition, the RF circuit 603 may also communicate with a network and another device by wireless communication. The wireless communication may use any communication standard or protocol, which includes but is not limited to, Global System for Mobile Communications (GSM), General Packet Radio Service (GPRS), Code Division Multiple Access (CDMA), Wideband Code Division Multiple Access (WCDMA), Long Term Evolution (LTE), email, Short Message Service (SMS), and the like.

The server further includes the power supply 604 (for example, a battery) that supplies power to each component. Preferably, the power supply may be logically connected to the processor 601 by using a power supply management system, so that functions such as management of charging, discharging, and power consumption are implemented by using the power supply management system. The power supply 604 may further include one or more of a direct current or alternating current power supply, a re-charging system, a power failure detection circuit, a power supply converter or inverter, a power supply state indicator, and any other components.

The server may further include the input unit 605. The input unit 605 may be configured to receive entered numeric or character information and generate keyboard, mouse, joystick, optical, or trackball signal input related to user settings and function control.

The server may further include the display unit 606. The display unit 606 may be configured to display information entered by the user or information provided to the user, and various graphical user interfaces of the server. The graphical user interfaces each may include an image, text, an icon, a video, or any combination thereof. The display unit 608 may include a display panel. In some embodiments, the display panel may be configured in a form of a liquid crystal display (LCD), an organic light-emitting diode (OLED), or the like.

Specifically, in this embodiment, the processor 601 of the server may load, according to the following instructions, executable files corresponding to processes of one or more applications into the memory 602. The processor 601 runs the applications stored in the memory 602, to implement various functions:

receiving an application generation request sent by a terminal, the application generation request carrying a web page address and application attribute information;

obtaining a corresponding application template according to the application generation request;

updating the application template according to the web page address and the application attribute information, to obtain an updated application template; and generating, according to the updated application template, an installation package of an application corresponding to the web page address.

For the foregoing operations, refer to the foregoing method embodiments. Details are not described herein again.

It can be learned from the above that, in this embodiment of this application, when the application generation request sent by the terminal is received, the corresponding application template may be obtained according to the application generation request, then the application template is updated according to the web page address and the application attribute information carried in the application generation request, to obtain an updated application template, and the installation package of the application corresponding to the web page address is generated according to the updated application template. In this solution, an installation package of a web page application may be automatically generated by using the application template, and code does not need to be manually written based on a Native App technology. Therefore, compared with the prior art, the generation efficiency of the installation package of the web page application may be improved.

A person of ordinary skill in the art may understand that all or some of the steps of the methods in the foregoing embodiments may be implemented by a program instructing relevant hardware. The program may be stored in a (e.g., non-transitory) computer-readable storage medium. The storage medium may include: a read-only memory (ROM), a random access memory (RAM), a magnetic disk, an optical disc, or the like.

In addition, an embodiment of this application further provides a non-transitory computer storage medium, where the non-transitory computer storage medium stores computer-readable instructions, so that at least one processor can perform the operations of any one of the foregoing method, for example, the operations of receiving an application generation request sent by a terminal, the application generation request carrying a web page address and application attribute information of a to-be-generated application; obtaining a corresponding first application template according to the application generation request; updating the first application template according to the web page address and the application attribute information, to obtain a second application template; and generating, according to the second application template, an installation package of an application corresponding to the web page address. For another example, the operations of obtaining a web page address and application attribute information; generating an application generation request according to the web page address and the application attribute information, the application generation request carrying the web page address and the application attribute information; and sending the application generation request to a server, so that the server generates, according to the application generation request, an installation package of an application corresponding to the web page address.

An application installation package generation method and apparatus according to the embodiments of this application are described in detail above. The principle and implementations of this application are described herein by using specific examples. The descriptions of the embodiments are merely used for helping understand the method and core ideas of this application. In addition, a person skilled in the art can make variations to this application in terms of the specific implementations and application scopes according to the ideas of this application. In conclusion, the content of the specification shall not be construed as a limit to this application.

What is claimed is:

1. An application installation package generation method performed at a computing system having one or more processors and memory storing a plurality of programs to be performed by the one or more processors, the method comprising:
  receiving an application generation request sent by a terminal, the application generation request carrying (i) a first web page address, (ii) application attribute information of a to-be-generated application, the application attribution information including application icon information, and (iii) application function selection information;
  obtaining a corresponding first application template according to the application generation request, wherein the first application template comprises a sample web page address, sample icon information, and application architecture information, wherein the application architecture information comprises function logical layer information, interaction interface layer information, and application bottom layer information, wherein the function logical layer information comprises multiple function modules;
  updating the first application template according to the first web page address and the application attribute information by replacing (i) the sample web page address with the first web page address, and (ii) the sample icon information with the application icon information, to obtain a second application template by:
    modifying the second application template according to the application architecture information and the application function selection information;
    selecting a corresponding target function module from the multiple function modules according to the function selection information; and
    modifying the second application template according to the target function module, the interaction interface layer information, and the application bottom layer information;
  generating, according to the second application template, an installation package of an application corresponding to the first web page address; and
  returning the generated installation package to the terminal.

2. The method according to claim 1, wherein the generating, according to the second application template, an installation package of an application corresponding to the first web page address comprises:
  calling a packaging process by using a script; and
  packaging the second application template by using the packaging process, to obtain an installation package of an application corresponding to the first web page address of the to-be-generated application.

3. The method according to claim 1, wherein returning the generated installation package to the terminal further comprises:
  sending to the terminal a downloading address of the installation package as an icon that includes the application icon information; and
  responsive to selection of the downloading address by the terminal, causing download of the installation package on the terminal.

4. The method according to claim 3, wherein the first web page address and the application attribute information are obtained by the terminal using an application generation page displayed on the terminal.

5. An application installation package generation apparatus, comprising:
  memory;
  one or more processors; and
  one or more instruction units stored in the memory that are configured to be executed by the one or more processors, the one or more instruction units comprising:
    a receiving unit, configured to receive an application generation request sent by a terminal, the application generation request carrying (i) a first web page address, (ii) application attribute information of a to-be-generated application, the application attribution information including application icon information, and (iii) application function selection information;
    an obtaining unit, configured to obtain a corresponding first application template according to the application generation request, wherein the first application template comprises a sample web page address, sample icon information, and application architecture information, wherein the application architecture information comprises function logical layer information, interaction interface layer information, and application bottom layer information, wherein the function logical layer information comprises multiple function modules;
    an update unit, configured to update the first application template according to the first web page address and the application attribute information by replacing (i) the sample web page address with the first web page address, and (ii) the sample icon information with the application icon information, to obtain a second application template by:
      modifying the second application template according to the application architecture information and the application function selection information;
      selecting a corresponding target function module from the multiple function modules according to the function selection information; and
      modifying the second application template according to the target function module, the interaction interface layer information, and the application bottom layer information; and
    a generation unit, configured to:
      generate, according to the second application template, an installation package of an application corresponding to the first web page address; and
      return the generated installation package to the terminal.

6. The apparatus according to claim 5, wherein the generation unit is further configured to generate, according to the second application template, the installation package of an application corresponding to the first web page address by:
  calling a packaging process by using a script; and
  packaging the second application template by using the packaging process, to obtain an installation package of an application corresponding to the first web page address of the to-be-generated application.

7. The apparatus according to claim 5, wherein the generation unit is further configured to return the generated installation package to the terminal by:
sending to the terminal a downloading address of the installation package as an icon that includes the application icon information; and
responsive to selection of the downloading address by the terminal, causing download of the installation package on the terminal.

8. The apparatus according to claim 7, wherein the first web page address and the application attribute information are obtained by the terminal using an application generation page displayed on the terminal.

9. A non-transitory computer readable storage medium storing one or more programs configured for execution by one or more processors of a computing system, the one or more programs comprising instructions which, when executed by the one or more processors, cause the computing system to:
receive an application generation request sent by a terminal, the application generation request carrying (i) a first web page address, (ii) application attribute information of a to-be-generated application, the application attribution information including application icon information, and (iii) function selection information;
obtain a corresponding first application template according to the application generation request, wherein the first application template comprises a sample web page address, sample icon information, and application architecture information, wherein the application architecture information comprises function logical layer information, interaction interface layer information, and application bottom layer information, wherein the function logical layer information comprises multiple function modules;
update the first application template according to the first web page address and the application attribute information by replacing (i) the sample web page address with the first web page address, and (ii) the sample icon information with the application icon information, to obtain a second application template by:
modifying the second application template according to the application architecture information and the application function selection information;
selecting a corresponding target function module from the multiple function modules according to the function selection information; and
modifying the second application template according to the target function module, the interaction interface layer information, and the application bottom layer information;
generate, according to the second application template, an installation package of an application corresponding to the first web page address; and
return the generated installation package to the terminal.

10. The computer readable storage medium according to claim 9, wherein the computing system is further configured to:
call a packaging process by using a script; and
package the second application template by using the packaging process, to obtain an installation package of an application corresponding to the first web page address of the to-be-generated application.

11. The computer readable storage medium according to claim 9, wherein the computing system is further configured to:
send to the terminal a downloading address of the installation package as an icon that includes the application icon information; and
responsive to selection of the downloading address by the terminal, cause download of the installation package on the terminal.

12. The method according to claim 1 wherein the various function modules comprise one or more of push, counting, settings, upgrade, downloading, sharing, picture viewing, and beacon.

13. The apparatus according to claim 5, wherein the various function modules comprise one or more of push, counting, settings, upgrade, downloading, sharing, picture viewing, and beacon.

14. The computer readable storage medium according to claim 9, wherein the various function modules comprise one or more of push, counting, settings, upgrade, downloading, sharing, picture viewing, and beacon.

* * * * *